US012005437B2

(12) United States Patent
Watson et al.

(10) Patent No.: US 12,005,437 B2
(45) Date of Patent: Jun. 11, 2024

(54) TWO-PHASE FLUSHING SYSTEMS AND METHODS

(71) Applicant: Illumina, Inc., San Diego, CA (US)

(72) Inventors: Nicholas Watson, San Diego, CA (US); Wesley A. Cox-Muranami, San Diego, CA (US); Cyril Delattre, San Diego, CA (US); Minsoung Rhee, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 723 days.

(21) Appl. No.: 16/884,852

(22) Filed: May 27, 2020

(65) Prior Publication Data

US 2020/0376482 A1 Dec. 3, 2020

Related U.S. Application Data

(60) Provisional application No. 62/853,577, filed on May 28, 2019.

(51) Int. Cl.
*B01L 3/00* (2006.01)

(52) U.S. Cl.
CPC ........... *B01L 3/502* (2013.01); *B01L 2200/16* (2013.01); *B01L 2300/042* (2013.01); *B01L 2300/044* (2013.01); *B01L 2300/047* (2013.01); *B01L 2300/14* (2013.01); *B01L 2400/0475* (2013.01); *B01L 2400/06* (2013.01)

(58) Field of Classification Search
None
See application file for complete search history.

(56) References Cited

U.S. PATENT DOCUMENTS 4,168,294 A 9/1979 Calzi et al.
5,993,740 A 11/1999 Niiyama et al.
(Continued)

FOREIGN PATENT DOCUMENTS

CN 1517712 A 8/2004
CN 1553969 A 12/2004
(Continued)

OTHER PUBLICATIONS

Procise®, "Protein Sequencing System," Advanced Operation User's Manual (2000).

(Continued)

*Primary Examiner* — Benjamin R Whatley
*Assistant Examiner* — Jacqueline Brazin
(74) *Attorney, Agent, or Firm* — MARSHALL, GERSTEIN & BORUN LLP

(57) ABSTRACT

Two-phase flushing systems and methods. An example method includes moving a valve to a first position to fluidly connect a first reagent reservoir containing a first reagent to a flow cell and flowing the first reagent from the first reagent reservoir to the flow cell to perform a biochemical reaction. The method includes moving the valve to a second position to fluidly connect a gas to the flow cell and flowing gas into the flow cell to expel at least a portion of the first reagent from the biochemical reaction from the flow cell. The method includes moving the valve to a third position to fluidly connect a buffer reagent reservoir containing a buffer reagent to the flow cell and flowing the buffer reagent into the flow cell.

11 Claims, 8 Drawing Sheets

500

(56) References Cited

U.S. PATENT DOCUMENTS

| | | | | |
|---|---|---|---|---|
| 6,989,130 | B2 | 1/2006 | Deshmukh | |
| 8,118,042 | B2 | 2/2012 | Ngo et al. | |
| 8,906,617 | B2 | 12/2014 | Rothberg et al. | |
| 10,338,044 | B2 | 7/2019 | Schwieters et al. | |
| 2002/0028926 | A1 | 3/2002 | Shoji et al. | |
| 2004/0063217 | A1 | 4/2004 | Webster et al. | |
| 2006/0245978 | A1 | 11/2006 | Prins | |
| 2009/0217951 | A1* | 9/2009 | Ngo | G01N 35/1004 134/22.12 |
| 2010/0105029 | A1* | 4/2010 | Ririe | B01L 7/52 435/6.12 |
| 2012/0055809 | A1 | 3/2012 | Glezer et al. | |
| 2015/0045234 | A1* | 2/2015 | Stone | G01N 35/1097 435/6.1 |
| 2016/0016171 | A1 | 1/2016 | Goel | |
| 2016/0319350 | A1 | 11/2016 | Stone et al. | |
| 2017/0144155 | A1 | 5/2017 | Bohm et al. | |
| 2017/0260567 | A1 | 9/2017 | Selden et al. | |
| 2017/0333904 | A1 | 11/2017 | Lyons et al. | |
| 2018/0188279 | A1 | 7/2018 | Whitacre et al. | |
| 2018/0280975 | A1 | 10/2018 | Kilcoin et al. | |

FOREIGN PATENT DOCUMENTS

| | | | |
|---|---|---|---|
| CN | 1596369 | A | 3/2005 |
| CN | 1767899 | A | 5/2006 |
| CN | 101482571 | A | 7/2009 |
| CN | 101960315 | A | 1/2011 |
| CN | 102735812 | A | 10/2012 |
| CN | 106093256 | A | 11/2016 |
| JP | H02-228562 | A | 9/1990 |
| JP | 2005-528584 | A | 9/2005 |
| JP | 2008-298755 | A | 12/2008 |
| JP | 2010-256050 | A | 11/2010 |
| JP | 2011-513737 | A | 4/2011 |
| JP | 2011-247617 | A | 12/2011 |
| JP | 2015-040804 | A | 3/2015 |
| JP | 2019-58172 | A | 4/2019 |
| WO | WO-2003/044528 | A2 | 5/2003 |
| WO | WO-2019/018759 | A1 | 1/2019 |

OTHER PUBLICATIONS

Aebersold, et al., “Accelerated high sensitivity sequence analysis of proteins and peptides immobilized on chemically-modified glass fiber discs”, In Methods in Protein Sequence Analysis, Springer, 1989, pp. 79-83, 86-89.

Elzinga, “Methods in Protein Sequence Analysis”, Humana Press, 1982, pp. 79-83, 86-89.

* cited by examiner

TWO-PHASE FLUSHING SYSTEMS AND METHODS

RELATED APPLICATION

This application claims the benefit of and priority to U.S. Provisional Patent Application No. 62/853,577, filed May 28, 2019, the content of which is incorporated by reference herein in its entirety and for all purposes.

BACKGROUND

Fluidic cartridges carrying reagents and a flow cell are sometimes used in connection with fluidic systems. The fluidic cartridges include fluidic lines through which the reagents flow. The reagent may be used during a flushing operation.

SUMMARY

In accordance with a first example, a method includes or comprises moving a valve to a first position to fluidly connect a first reagent reservoir containing a first reagent to a flow cell. The method includes or comprises flowing the first reagent from the first reagent reservoir into the flow cell to perform a biochemical reaction. The method includes or comprises moving the valve to a second position to fluidly connect gas to the flow cell and flowing the gas into the flow cell to expel at least a portion of the first reagent from the biochemical reaction from the flow cell. The method includes or comprises moving the valve to a third position to fluidly connect a buffer reagent reservoir containing a buffer reagent to the flow cell and flowing the buffer reagent into the flow cell. The method includes or comprises moving the valve to the second position to fluidly connect the gas to the flow cell and flowing the gas to the flow cell to expel at least a portion of the buffer reagent from the flow cell. The method includes or comprises moving the valve to the third position to fluidly connect the buffer reagent reservoir to the flow cell and flowing the buffer reagent into the flow cell. The method includes or comprises moving the valve to a fourth position to fluidly connect a second reagent reservoir containing a second reagent to the flow cell.

In accordance with a second example, an apparatus includes or comprises a fluidics cartridge receivable within a cartridge receptacle of a system and adapted to carry a flow cell. The fluidics cartridge includes or comprises a first reagent reservoir containing a first reagent and a buffer reagent reservoir containing a buffer reagent, a valve, and a body including or comprising fluidic lines and an inlet port. The inlet port is adapted to be coupled to a gas source. The body carries the first reagent reservoir, the buffer reagent reservoir, and the valve. The fluidic lines fluidly couples the inlet port, the first reagent reservoir, the buffer reagent reservoir, the valve, and the flow cell. The valve is movable: to a first position to fluidly connect the first reagent reservoir to the flow cell to flow the first reagent from the first reagent reservoir into the flow cell to perform a biochemical reaction, to a second position to fluidly connect the gas source to the flow cell to flow gas into the flow cell to expel at least a portion of the first reagent from the biochemical reaction from the flow cell, and to a third position to fluidly connect the buffer reagent reservoir to the flow cell to flow the buffer reagent into the flow cell.

In accordance with a third example, an apparatus includes or comprises a system including or comprising: a valve drive assembly, a cartridge receptacle, and one or more processors, the one or more processors coupled to the valve drive assembly. The apparatus includes or comprises a reagent cartridge receivable within the cartridge receptacle. The reagent cartridge includes or comprises: a reagent reservoir, a flow cell, a valve, and fluidic lines. One or more of the fluidic lines fluidly couples the reagent reservoir, the flow cell, and the valve. The apparatus includes or comprises a gas source. The one or more processors is adapted to cause the valve drive assembly to actuate the valve between a first position flowing reagent to the flow cell and a second position flowing gas to the flow cell.

In accordance with a fourth example, a method includes or comprises moving a valve to a first position to fluidly connect a first reagent reservoir containing a first reagent to a flow cell and flowing the first reagent from the first reagent reservoir to the flow cell to perform a biochemical reaction. The method includes moving the valve to a second position to fluidly connect gas to the flow cell and flowing the gas into the flow cell to expel at least a portion of the first reagent from the biochemical reaction from the flow cell. The method includes moving the valve to a third position to fluidly connect a buffer reagent reservoir containing a buffer reagent to the flow cell and flowing the buffer reagent into the flow cell.

In accordance with a fifth example, a method includes or comprises pressurizing one or more reagent reservoirs of a reagent cartridge via a gas source. The reagent cartridge carries a flow cell and fluidic lines. One or more of the reagent reservoirs contains reagent. One or more of the fluidic lines fluidly couple the reagent reservoirs and the flow cell. The method also includes or comprises iteratively and alternatingly flowing gas and reagent through the reagent cartridge and the flow cell.

In accordance with a sixth example, an apparatus includes or comprises a fluidics cartridge receivable within a cartridge receptacle of a system and adapted to carry a flow cell. The fluidics cartridge includes or comprises reservoirs having or comprising outlets, a valve, and a body including or comprising fluidic lines and an inlet port. The inlet port is adapted to be coupled to a gas source. The body carries the reservoirs and the valve. The fluidic lines fluidly couples the inlet port, the reservoirs, the valve, and the flow cell. The valve is actuatable to perform a two-phase flushing operation to selectively flow one of gas received at the gas source to the flow cell and fluid from a first one of the reservoirs to the flow cell.

In accordance with a seventh example, an apparatus includes or comprises a system, including or comprising: a valve drive assembly, a cartridge receptacle, and one or more processors. The one or more processors coupled to the valve drive assembly. The apparatus also includes or comprises a reagent cartridge receivable within the cartridge receptacle. The reagent cartridge includes or comprises a reagent reservoir, a flow cell, a valve, and fluidic lines. One or more of the fluidic lines fluidly couples the reagent reservoir, the flow cell, and the valve. The apparatus includes or comprises a gas source. The gas source is to be fluidly coupled to the valve and to the reagent reservoir to pressurize the reagent reservoir. The one or more processors is adapted to cause the valve drive assembly to actuate the valve between a first position flowing reagent to the flow cell and a second position flowing gas to the flow cell.

In accordance with an eighth example, a method includes or comprises pressurizing one or more reagent reservoirs of a reagent cartridge. The reagent cartridge carries a flow cell and includes or comprises the reagent reservoirs and fluidic lines. The reagent reservoirs contain reagent. One or more of the fluidic lines fluidly couple the reagent cartridges and the flow cell. The method also includes or comprises performing a two-phase flushing operation of the reagent cartridge and the flow cell including or comprising selectively flowing one of reagent and gas through the flow cell.

In further accordance with the foregoing first, second, third, fourth, fifth, sixth, seventh, and/or eighth examples, an apparatus and/or method may further include or comprise any one or more of the following:

In accordance with one example, moving the valve to the first position includes or comprises actuating a first valve to fluidly connect the first reagent reservoir and moving the valve to the second position includes or comprises actuating a second valve to fluidly connect the gas to the flow cell.

In accordance with another example, further including or comprising pressurizing the buffer reagent reservoir.

In accordance with another example, flowing the gas to the flow cell includes or comprises flowing the gas through a reagent reservoir that is substantially empty.

In accordance with another example, flowing the gas to the flow cell includes or comprises flowing the gas through a fluidic line coupled between a gas source and the flow cell.

In accordance with another example, flowing the gas to the flow cell includes or comprises flowing the gas through a manifold of a reagent cartridge. The reagent cartridge carries the first reagent reservoir, the buffer reagent reservoir, and the second reagent reservoir.

In accordance with another example, further including or comprising a second reagent reservoir containing a second reagent. The fluidic lines fluidly couples the inlet port, the second reagent reservoir, the valve, and the flow cell. The valve is further movable: to the second position to fluidly connect the gas source to the flow cell to flow gas into the flow cell to expel at least a portion of the buffer reagent from the flow cell, to the third position to fluidly connect the buffer reagent reservoir to the flow cell to flow the buffer reagent into the flow cell, and to a fourth position to fluidly connect the second reagent reservoir to the flow cell.

In accordance with another example, the buffer reagent reservoir is pressurized via the gas source.

In accordance with another example, further including or comprising a second reagent reservoir. In the second position and when the second reagent reservoir does not substantially contain fluid, the gas source is fluidly connected to the flow cell through the second reagent reservoir.

In accordance with another example, one of the fluidic lines directly fluidly couples the inlet port and the flow cell.

In accordance with another example, the fluidics cartridge includes or comprises a manifold. The manifold includes or comprises the inlet port, the fluidic lines coupling the manifold, the valve, and the buffer reagent reservoir.

In accordance with another example, the inlet port includes or comprises an interface adapted to be sealingly engaged by the system when the fluidics cartridge is received within the cartridge receptacle to fluidly couple the inlet port and the gas source of the system.

In accordance with another example, the inlet port includes or comprises walls that extend from a base. The walls have or comprise a first portion and a second portion. The first portion is coupled to the base. The second portion forms an interface that is adapted to couple with the gas source. The base define outlets that are fluidly coupled to the reservoirs.

In accordance with another example, the gas source includes or comprises a compressed-gas cartridge.

In accordance with another example, further including or comprising a plug and a piercing mechanism. The receptacle include or comprise a first portion and a second portion. The piercing mechanism is disposed within the first portion and is adapted to pierce the compressed-gas cartridge to allow gas to flow into the manifold. The plug is coupled to the manifold adjacent the second portion.

In accordance with another example, the body includes or comprises the reservoirs.

In accordance with another example, the gas source is to be fluidly coupled to the valve and to the reagent reservoir to pressurize the reagent reservoir.

In accordance with another example, further including or comprising a second reagent reservoir and flowing gas to the flow cell includes or comprises flowing gas through the second reagent reservoir to the flow cell.

In accordance with another example, further including or comprising a regulator. The regulator is coupled between the gas source and the reagent reservoir.

In accordance with another example, the reagent cartridge includes or comprises a manifold. The manifold is coupled to the gas source. The fluidic lines couple the manifold and the reagent cartridge.

In accordance with another example, the manifold includes or comprises an inlet port and the system includes or comprises the gas source. The inlet port is adapted to be fluidly coupled with the gas source.

In accordance with another example, the manifold includes or comprises a receptacle adapted to receive the gas source.

In accordance with another example, the reagent cartridge contains the reagent.

In accordance with another example, moving the valve to the first position includes or comprises actuating a first valve to fluidly connect the first reagent reservoir, moving the valve to the second position includes or comprises actuating a second valve to fluidly connect the gas to the flow cell, and moving the valve to the third position includes or comprises actuating a third valve to fluidly connect the buffer reagent reservoir to the flow cell.

In accordance with another example, further including or comprising pressurizing the buffer reagent reservoir.

In accordance with another example, flowing the gas to the flow cell includes or comprises flowing the gas through a manifold of a reagent cartridge. The reagent cartridge carries the first reagent reservoir and the buffer reagent reservoir.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

Figure 1:
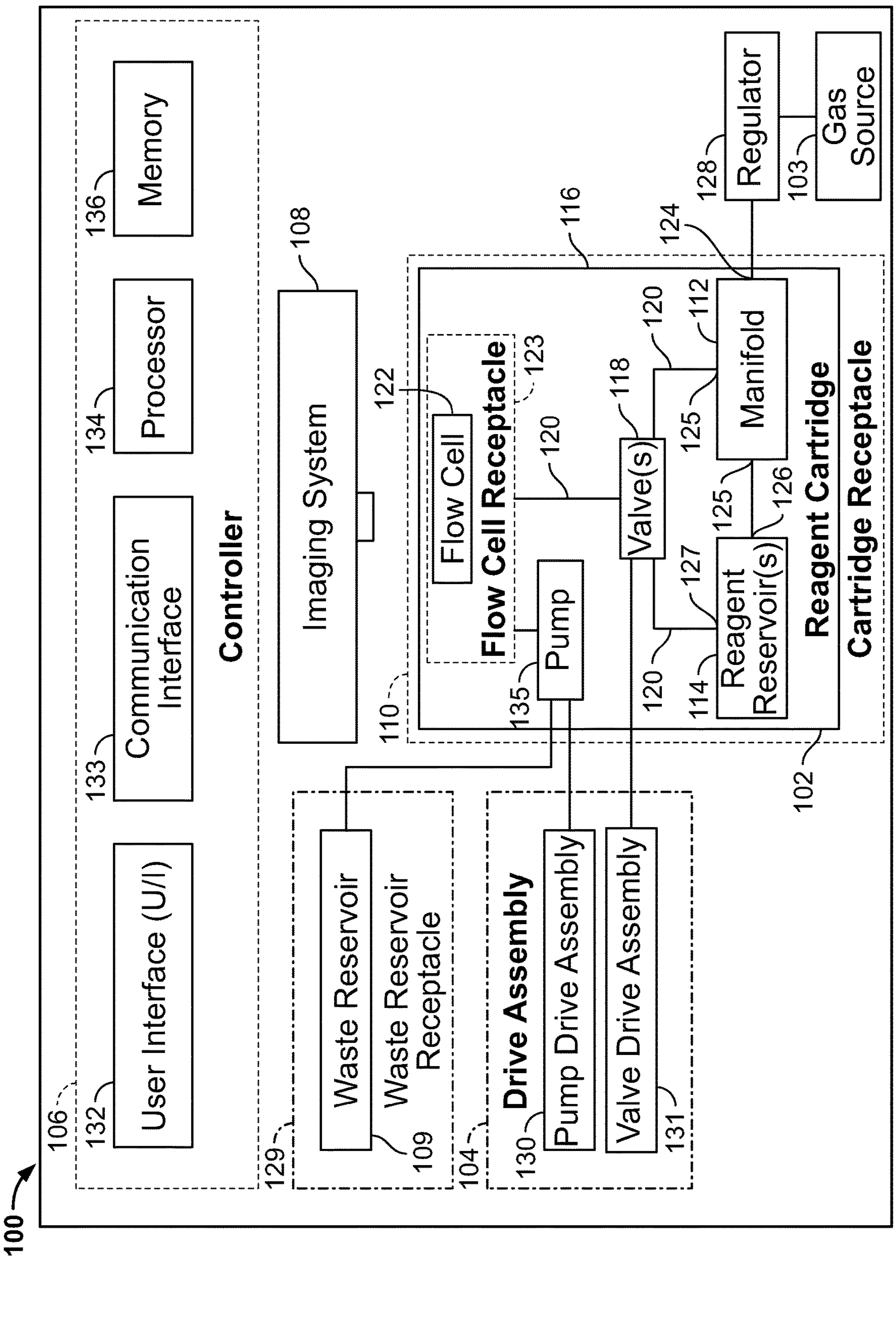
FIG. 1 illustrates a schematic diagram of an example system in accordance with the teachings of this disclosure.

Although the following text discloses a detailed description of example methods, apparatus, and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

The examples disclosed herein relate to fluidic cartridges adapted to perform two-phase flushing operations. The two-phase flushing operations use laminar flow and shearing to wash off contamination during sequencing-by-synthesis (SBS) chemistry and/or during other fluidic operations, for example. The disclosed examples also relate to fluidic instruments (e.g., sequencing platforms) that are adapted to interface with the fluidic cartridges to cause the two-phase flushing operation to occur.

In an example, a fluidic cartridge includes a manifold that is fluidly coupled to one or more reagent reservoirs and to the flow cell. Thus, the reagent reservoirs can be pressurized. Alternatively, the reagent reservoirs are not pressurized. The manifold is couplable to a gas source. A valve is disposed between the reagent reservoirs and the flow cell and is actuatable to flow reagent to the flow cell. The valve is also actuatable to flow gas to the flow cell. In some examples, the manifold is directly coupled to the valve to allow gas to selectively flow into the flow cell separate from a reagent reservoir. In other examples, gas is allowed to selectively flow to the valve through one of the reagent reservoirs when (or if) that reagent reservoir does not substantially contain reagent.

In a first flushing operation example, the two phase flushing operation includes iteratively and alternatingly flowing a buffer reagent and gas through the flow cell. Such an approach allows the gas to purge a bulk of the reagent from the flow cell and/or fluidic lines, then utilizes the buffer reagent (e.g., a wash buffer) to dilute and/or mix with any remnant prior reagent that may be in areas of the reagent cartridge that do not get purged by the gas or are otherwise difficult to wash. Subsequent sequences of gas and buffer reagent can further purge and dilute any remnant prior reagent. The iterative and alternative flow of gas and buffer reagent reduces a volume of buffer reagent needed to dilute and/or purge the prior reagent from the flow cell and/or fluidic lines, for example. Further, such an approach of following the gas with reagent allows the reagent to purge gas bubbles from the system.

In a second flushing operation example, the two phase flushing operation includes flowing gas through the flow cell and then flowing a buffer reagent to the flow cell without the repetition disclosed above. By structuring the example fluidic cartridge to perform two-phase flushing operations, the fluidic cartridges disclosed herein can increase flush efficiency. "Flush efficiency" as used herein refers to an amount of buffer reagent used during a flushing operation. For example, in one example, flush efficiency is a metric that describes how much volume of reagent is needed to remove the previous reagent. Thus, using the disclosed examples, less reagent can be used during flushing operations while achieving, for example, a residual concentration below about 0.01%. Using less reagent for the flushing operations allows the fluidic cartridges to carry less reagent and to be made smaller, weigh less and/or cost less to produce.

FIG. 1 illustrates a schematic diagram of an example system 100 in accordance with the teachings of this disclosure. The system 100 can be used to perform an analysis on one or more samples of interest. The sample may include one or more DNA clusters that have been linearized to form a single stranded DNA (sstDNA). In the example shown, the system 100 is adapted to receive a reagent cartridge 102 and includes, in part, a gas source 103, a drive assembly 104, a controller 106, an imaging system 108, and a waste reservoir 109. The controller 106 is electrically and/or communicatively coupled to the drive assembly 104 and to the imaging system 108 and is adapted to cause the drive assembly 104 and/or the imaging system 108 to perform various functions as disclosed herein.

The reagent cartridge 102 carries the sample of interest. The gas source 103 may, in some implementations, be used to pressurize the reagent cartridge 102 and the drive assembly 104 interfaces with the reagent cartridge 102 to flow one or more reagents (e.g., A, T, G, C nucleotides) that interact with the sample through the reagent cartridge 102. The gas source 103 may be provided by the system 100 and/or may be carried by the reagent cartridge 110 (see, for example, FIG. 8).

In an example, a reversible terminator is attached to the reagent to allow a single nucleotide to be incorporated by the sstDNA per cycle. In some such examples, one or more of the nucleotides has a unique fluorescent label that emits a color when excited. The color (or absence thereof) is used to detect the corresponding nucleotide. In the example shown, the imaging system 108 is adapted to excite one or more of the identifiable labels (e.g., a fluorescent label) and thereafter obtain image data for the identifiable labels. The labels may be excited by incident light and/or a laser and the image data may include one or more colors emitted by the respective labels in response to the excitation. The image data (e.g., detection data) may be analyzed by the system 100. The imaging system 108 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 104 interfaces with the reagent cartridge 102 to flow another reaction component (e.g., a reagent) and/or gas through the reagent cartridge 102 that is thereafter received by the waste reservoir 109 and/or otherwise exhausted by the reagent cartridge 102. The reagent and the gas can be alternatingly flowed through the reagent cartridge 102. The reaction component and the gas perform a flushing operation that chemically cleaves the fluorescent label and the reversible terminator from the sstDNA. The sstDNA is then ready for another cycle.

Referring to the reagent cartridge 102, in the example shown, the reagent cartridge 102 is receivable within a cartridge receptacle 110 of the system 100 and includes a manifold 112, reagent reservoirs 114, a body 116, one or more valves 118, and fluidic lines 120. In other examples, the reagent cartridge 102 does not include the manifold 112. The reagent reservoirs 111 may contain fluid (e.g., reagent and/or another reaction component) and the valves 118 may be selectively actuatable to control the flow of fluid through the fluidic lines 120. One or more of the valves 118 may be implemented by a rotary valve, a pinch valve, a flat valve, a solenoid valve, a check valve, a piezo valve, etc. The body 116 may be formed of solid plastic using injection molding techniques and/or additive manufacturing techniques. In some examples, the reagent reservoirs 114 are integrally formed with the body 116. In other examples, the reagent reservoirs 114 are separately formed and coupled to the body 116.

The manifold 112 is fluidly coupled to the gas source 103, the reagent reservoirs 114, and the valve 118. As a result, gas (e.g., air) flows through the manifold 112 to the reagent reservoirs 114 to pressurize the reagent cartridge 102 and to the valve 118. Pressurizing the reagent cartridge 102 allows for a flushing operation to take place during which air and/or reagent flow through a flow cell 122 under positive pressure. Flowing the reagent through the fluidic lines 120 under positive pressure increases the flow rate through the reagent cartridge 102 and/or decreases a response time to flow the reagent into, for example, the flow cell 122 and, more generally, reduces cycle times of the system 100. Alternatively, the reagent reservoirs 114 may not be pressurized.

The reagent cartridge 102 is in fluid communication with the flow cell 122. In the example shown, the flow cell 122 is carried by the reagent cartridge 102 and is received via a flow cell receptacle 123. Alternatively, the flow cell 122 can be integrated into the reagent cartridge 102. In such examples, the flow cell receptacle 123 may not be included or, at least, the flow cell 122 may not be removably receivable within the reagent cartridge 102. As a further alternative, the flow cell 122 may be separate from the reagent cartridge 102.

The manifold 112 includes an inlet 124 fluidly coupled to the gas source 103 and the outlets 125. One of the outlets 125 may be fluidly coupled to an inlet 126 of the reagent reservoir 114 and one of the outlets 125 may be fluidly coupled to the valve 118. As an alternative, the fluidic line 120 between the manifold 112 and the valve 118 may be removed such that the manifold 112 is coupled to the valve 118 via the reagent reservoir 114 (See, for example, FIGS. 2-8). The reagent reservoir 114 also includes an outlet 127 fluidly coupled to the valve 118.

A regulator 128 can be positioned between the gas source 103 and the manifold 112 and is adapted to regulate a pressure of the gas provided to the manifold 112. Alternatively, the regulator 128 may not be included. The regulator 128 may be implemented by a multi-channel regulator. In an example, the pressure applied to, for example, the reagent reservoir 114, is determined by calibrating a flow rate in the reagent cartridge 102 to a pressure of the gas source 103. However, the pressure may be selected in different ways. Alternatively, one or more regulators 128 may be positioned between the manifold and the reagent reservoir 114 and/or between the manifold 112 and the valve 118.

While the above disclosure describes urging reagent through the flow cell 122 under positive pressure, reagent may alternatively be drawn through the flow cell 122 under negative pressure when, for example, the reagent reservoirs 114 are not pressurized. To do so, the reagent cartridge 110 may include a pump 135 positioned between the flow cell 122 and the waste reservoir 109. The waste reservoir 109 may be selectively receivable within a waste reservoir receptacle 129 of the system 100. The pump 135 may be implemented by a syringe pump, a peristaltic pump, a diaphragm pump, etc. While the pump 135 may be positioned between the flow cell 122 and the waste reservoir 109, in other examples, the pump 135 may be positioned upstream of the flow cell 122 or omitted entirely.

Referring now to the drive assembly 104, in the example shown, the drive assembly 104 includes a pump drive assembly 130 and a valve drive assembly 131. The pump drive assembly 130 is adapted to interface with the pump 135 to pump fluid through the reagent cartridge 110. The valve drive assembly 131 is adapted to interface with the valve 118 to control the position of the valve 118. In an example, the valve 118 is implemented by a rotary valve having a first position that blocks flow to the flow cell 122, a second position that allows flow from the reagent reservoir 114 to the flow cell 122, and a third position that allows gas flow from the gas source 103 to the flow cell 122. However, the valve 118 may be positioned in any number of positions to flow any one or more of a first reagent, a buffer reagent, gas, a second reagent, etc. to the flow cell 122. In such examples, the valve drive assembly 131 may include a shaft that actuates the valve 118 to perform a flushing operation where the position of the valve 118 is alternated between flowing gas through the flow cell 122 for a threshold amount of time to flowing reagent through the flow cell 122 for a threshold amount of time to flowing gas through the flow cell 122 for a threshold amount of time and so on. Alternatively, the valve drive assembly 131 may perform a flushing operation where the position of the valve 118 is alternated between flowing gas through the flow cell 122 to flowing reagent through the flow cell 122 without again flowing gas through the flow cell 122. However, flushing operations may be performed in any desired sequence.

By performing a flushing operation where gas flows through the flow cell 122 in addition to reagent flowing through the flow cell 122, in some examples, a volume of reagent (e.g., wash buffer) may be reduced by about 50% and a volume of the reagent cartridge 110 may be reduced by about 30% to about 50% as compared to volumes needed when reagent (e.g., wash buffer) alone is utilized. However, depending on the fluidic architecture of the reagent cartridge 110, the reduction in size and/or the reduction in reagent volume carried by the reagent cartridge 110 may be different. By reducing the volume of reagent, a reagent thaw time (e.g., an amount of time it takes to de-thaw the reagent) is correspondingly reduced and a size of the reagent reservoir 114 is also reduced. Put another way, reagent cartridges produced using the disclosed examples may include less reagent, have a smaller foot print, use less material, cost less, and/or weigh less.

Referring to the controller 106, in the example shown, the controller 106 includes a user interface 132, a communication interface 133, one or more processors 134, and a memory 136 storing instructions executable by the one or more processors 134 to perform various functions including the disclosed examples. The user interface 132, the communication interface 133, and the memory 136 are electrically and/or communicatively coupled to the one or more processors 134.

In an example, the user interface 132 is adapted to receive input from a user and to provide information to the user associated with the operation of the system 100 and/or an analysis taking place. The user interface 132 may include a touch screen, a display, a key board, a speaker(s), a mouse, a track ball, and/or a voice recognition system. The touch screen and/or the display may display a graphical user interface (GUI).

In an example, the communication interface 133 is adapted to enable communication between the system 100 and a remote system(s) (e.g., computers) via a network(s). The network(s) may include an intranet, a local-area network (LAN), a wide-area network (WAN), the intranet, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 134 and/or the system 100 may include one or more of a processor-based system(s) or a microprocessor-based system(s). In some examples, the one or more processors 142 and/or the system 100 includes a reduced-instruction set computer(s) (RISC), an application specific integrated circuit(s) (ASICs), a field programmable gate array(s) (FPGAs), a field programmable logic device(s) (FPLD(s)), a logic circuit(s), and/or another logic-based device executing various functions including the ones described herein.

The memory 136 can include one or more of a hard disk drive, a flash memory, a read-only memory (ROM), erasable programmable read-only memory (EPROM), electrically erasable programmable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

Figure 2:
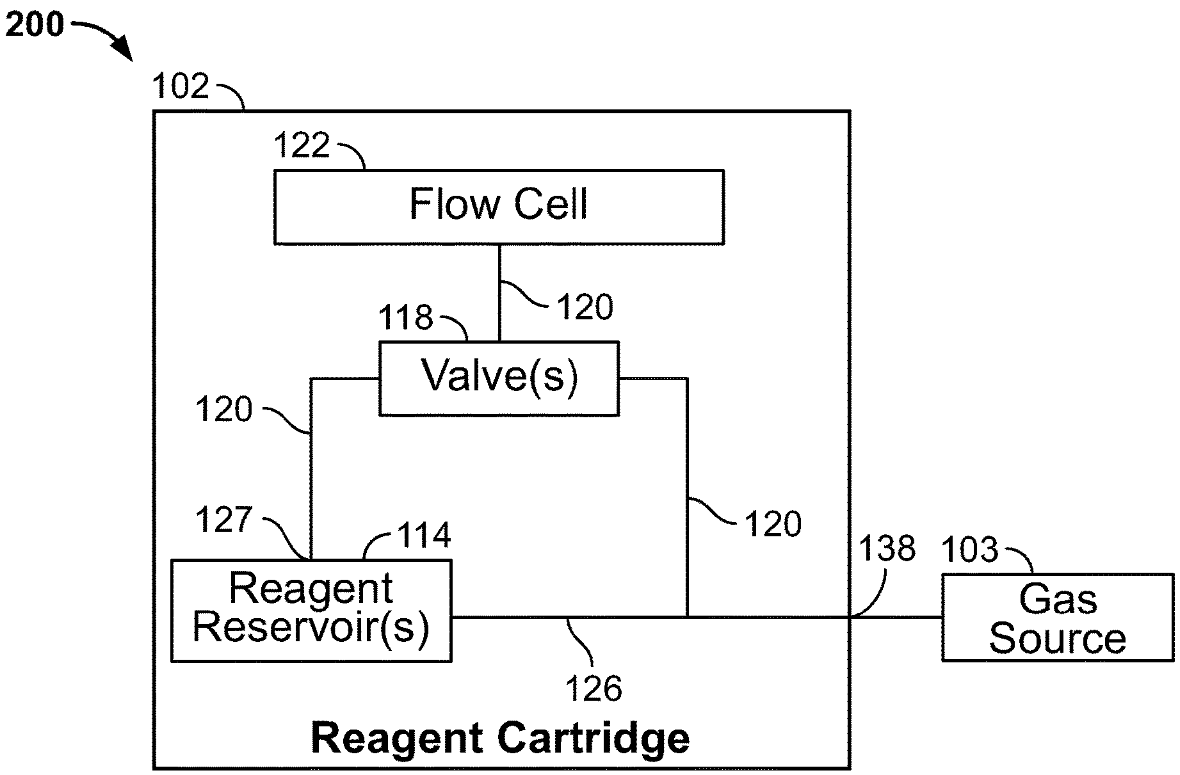
FIG. 2 illustrates a schematic diagram of another reagent cartridge in accordance with the teachings of this disclosure.

FIG. 2 illustrates a schematic diagram of another reagent cartridge 200 in accordance with the teachings of this disclosure. The reagent cartridge 200 may be receivable within the cartridge receptacle 110 of FIG. 1. Elements of the reagent cartridge 200 which are the same or similar to the reagent cartridge 102 of FIG. 1 are designated by the same reference numeral. A description of these elements is abbreviated or eliminated in the interest of brevity. In contrast to the reagent cartridge 102 of FIG. 1, the reagent cartridge 200 of FIG. 2 does not include the manifold 112, the flow cell receptacle 123, nor the pump 135 but it does include an inlet port 138 in direct communication with the gas source 103. In some examples, the gas source 103 is carried by the reagent cartridge 102. In other examples, the gas source 103 is provided by the system 100, for example.

Figure 3:
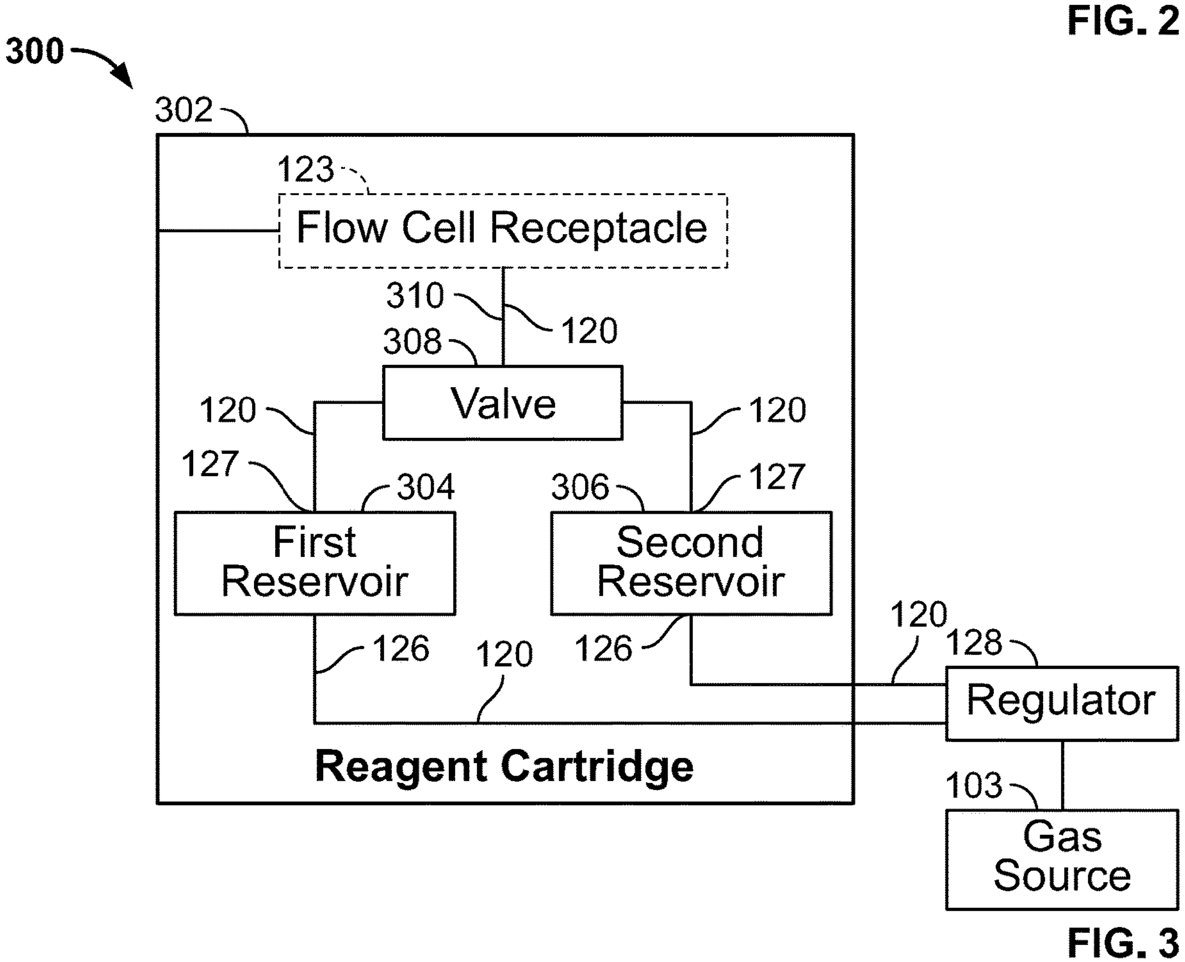
FIG. 3 illustrates a schematic diagram of another reagent cartridge in accordance with the teachings of this disclosure.
Figure 4:
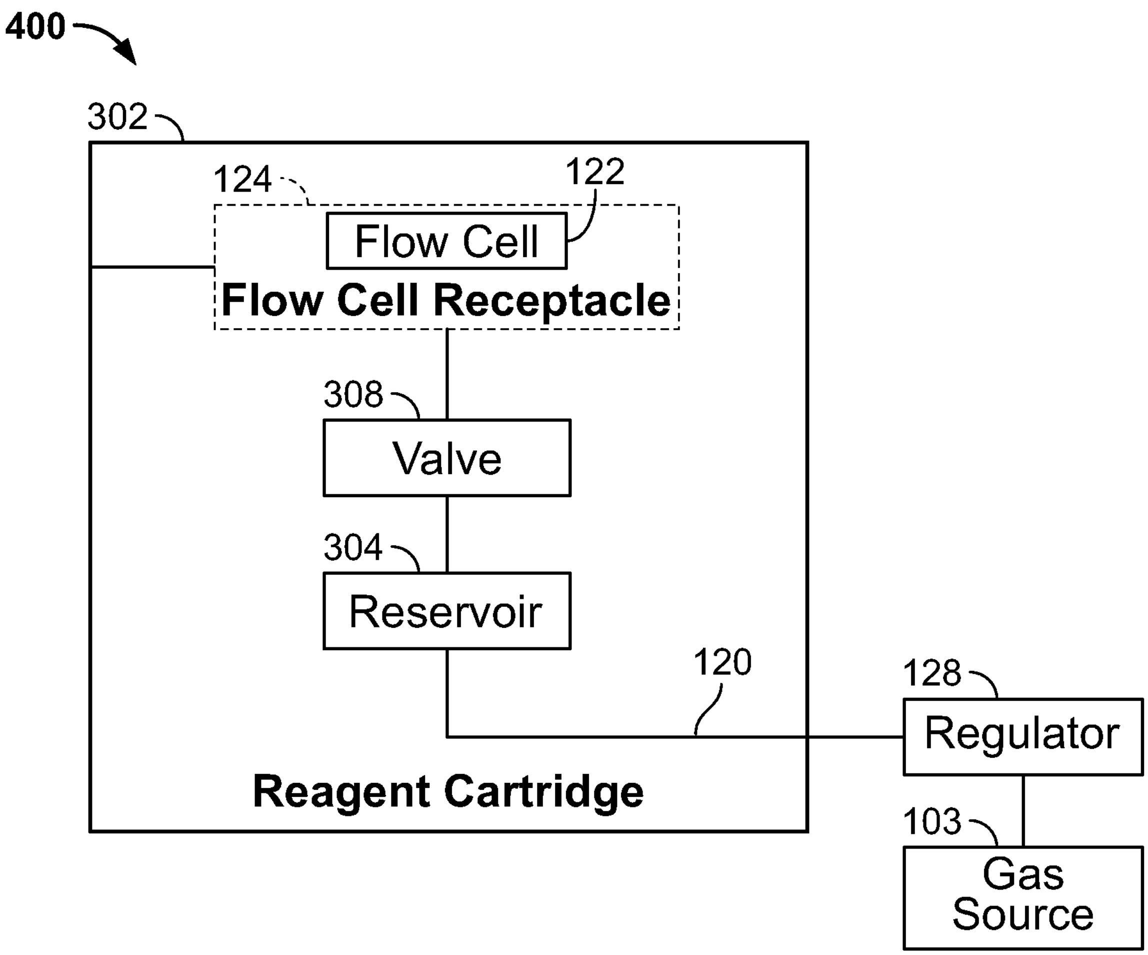
FIG. 4 illustrates a schematic diagram of another reagent cartridge in accordance with the teachings of this disclosure.

While the examples disclosed above illustrate the gas source 103 directly fluidly coupled to the valve 118, the reagent reservoirs 114 themselves may be used to flow gas to the flow cell 122 when they are at least substantially empty. As set forth herein, the phrase substantially empty means that the reagent reservoir(s) 114 allows gas to flow through the reagent reservoir 114 to the flow cell 122 as opposed to when the reagent reservoir 114 contains reagent and the gas is used to urge the reagent toward the flow cell 122. One such detailed example of a reagent cartridge 300 is illustrated in FIG. 3 and another such detailed example of a reagent cartridges 400 is illustrated in FIG. 4. These reagent cartridges 300, 400 may be receivable within the cartridge receptacle 110 of the system 100 of FIG. 1 and are adapted to interface with the drive assembly 104 of the system 100 to perform the fluidic and/or analysis operations disclosed.

Referring to FIG. 3, the reagent cartridge 300 includes a body 302, a first reservoir 304, a second reservoir 306, a valve 308, and the flow cell receptacle 123, that are all fluidly coupled via the fluidic lines 120. In the example shown, the first and second reservoirs 304, 306 are independently fluidly coupled to the gas source 103 via the associated regulator 128. In such examples, the regulator 128 may pressurize the first reservoir 304 to a first pressure and may pressurize the second reservoir 306 to a second pressure. The first and second pressures may be the same or different. As an example, the first reservoir 304 may be pressurized to about 30 pounds per square inch (psi) and the second reservoir 306 may be pressurized to about 5 psi. However, any other pressure may be used or the regulator 128 may be omitted. In other examples, the reagent cartridge 300 includes an inlet port fluidly coupled to the gas source 103 that provides gas to both the first and second reservoirs 304, 306.

Regardless of how the reagent reservoirs 304, 306 are fluidly coupled to the gas source 103, the gas source 103 pressurizes the reservoirs 304, 306. When the first reservoir 304 contains fluid (e.g., a reagent), pressurizing the first reservoir 304 allows the fluid to flow through the reagent cartridge 300 under positive pressure. When the first reservoir 304 does not contain fluid (e.g., the fluid has been emptied), pressurizing the first reservoir 304 allows gas to flow through the first reservoir 304 to the flow cell receptacle 123 during, for example, an example flushing operation.

The valve 308 may be implemented by a rotary valve. However, other types of valves may be used. In an example, the valve drive assembly 131 is adapted to interface with the valve 308 to move the valve 308 between a first (closed/blocked) position, a second position fluidly coupling the first reservoir 304 and the flow cell receptacle 123, and a third position fluidly coupling the second reservoir 304 and the flow cell receptacle 123. While not shown, in some examples, the flow cell receptacle 123 carries a flow cell (e.g., the flow cell 122).

In an example flushing operation when the first reservoir 304 contains fluid and the second reservoir 306 does not substantially contain fluid, a flushing operation can be performed by moving the valve 118 from the third position, to the second position, and then to the first position. Such an approach may be referred to as an "air flush method." In some implementations, the second reservoir 306 may be omitted such that a fluidic line 120 is directly connected to the valve 308 and/or to the flow cell receptacle 123. In the example shown, the first and second reservoirs 304, 306 are coupled to the flow cell 122 using a common line 310. Alternatively, each reservoir 304, 306 may be coupled to the flow cell 122 via different fluidic lines. In such examples, additional valves may be included to control the flow to the flow cell 122 from the respective reservoirs 304, 306 (See, FIG. 5, for example).

To perform the air-flush method, in an example, the second reservoir 306 is pressurized to about 30 psi and the valve 308 is positioned in the third position flowing gas to the flow cell for about 10 seconds. While 30 psi is mentioned, other pressures may be used (e.g., 21 psi, 27 psi, 33 psi, 33.5 psi, etc.). Further, while the valve 118 is mentioned as being in the third position for about 10 seconds, other time periods may be used instead (e.g., 7 seconds, 8 seconds, 12 seconds, 13.3 seconds, etc.).

In another example flushing operation when the first reservoir 304 contains fluid and the second reservoir 306 does not substantially contain fluid, a flushing operation can be performed by moving the valve 308 back and forth between the second and third positions for a threshold number of cycles and/or between the first, second, and third positions for a threshold number of cycles, thereby allowing gas flowing through the reagent cartridge 300 to be followed by reagent that urges the gas (e.g., bubbles) out of the reagent cartridge 300, for example. Such an approach may be referred to as an "air burst method," during which a relatively small volume of reagent (e.g., wash buffer) is dispensed during each cycle (e.g., sweep) of the valve 308 that is followed by gas. In some examples, the valve 308 is moved between the first, second, and third positions for 24 cycles. However, any other number of cycles may be used (e.g., 9 cycles, 10 cycles, 15 cycles, 25 cycles, etc.). In an example in which the valve 308 is implemented as a rotary valve, the valve 308 can be rotated between the first position and the third position, with the valve 308 delaying for approximately 250 ms at the first position and delaying approximately 250 ms at the third position. However, the valve 308 may delay at the first and/or third positions for a different amount of time (e.g., 150 ms, 200 ms, 300 ms, 310 ms, etc.) and the length of delay at the first and third positions may be the same or different from one another. In this example, the valve 308 may not be commanded to the second position given that gas is allowed to flow to the flow cell 122 as the valve 308 moves across the second position at the valve 308 moves between the first and third positions.

Using the disclosed examples, a two-phase flow is produced that increases flush efficiency and/or produces surface tension effects at an air-fluid interface that provides enhanced fluidic channel flushing. As an example, as the air flows through the fluidic lines 120, the air interacts with the fluid and urges the fluid onto the sides of the fluidic lines 120 and/or into corners or bends in the fluidic lines 120 that may not otherwise be possible without the air flush. As a result, the disclosed examples have increased bubble clearing efficiency when, for example, flushing at higher flow rates and/or when using higher flush volumes. Specifically, pumping fluid at a higher average velocity (a higher flow rate) increases bubble mobilization, and, therefore, increases bubble clearing efficiency. Additionally or alternatively, the reagent cartridge 300 may include geometries to improve air bubble flushing.

In some examples, the flow rate of the fluid from the first reservoir 304 is about 1500 microliters per minute (μL/min), the first reservoir 304 is pressurized at about 30 psi, the second reservoir 306 is pressurized at about 5 psi, and the valve 118 remains in each of the first position and the second position for about 250 milliseconds (ms). While a flow rate of about 1500 μL/min is mentioned, other flow rates may be used instead (e.g., 1400 μL/min, 1550 μL/min, 1725 μL/min, etc.). While the first reservoir 304 is mentioned being pressurized at 30 psi, other pressures may be used instead (e.g., 20 psi, 27 psi, 33, psi, 37 psi, etc.). Additionally, while the second reservoir 306 is mentioned being pressurized at 5 psi to flow a corresponding amount of pressure through the reagent cartridge 300, other pressures may be used instead (e.g., 4 psi, 4.5 psi, 8.3 psi, 9 psi, etc.). Further, while a threshold amount of time of 250 ms is mentioned where the valve 308 is in the second position and the third position and/or when the valve 308 is in the first position, the second position and the third position, the valve 308 may be in the second position for a first threshold amount of time and the valve 308 may be in the third position for a second threshold amount of time. The first and second thresholds can be the same or different (e.g., 175 ms, 200 ms, 215 ms, 300 ms, etc.).

Referring to FIG. 4, the reagent cartridge 400 is similar to the reagent cartridge 300. Elements of the reagent cartridge 400 which are the same or similar to the reagent cartridge 300 of FIG. 1 are designated by the same reference numeral. A description of these elements is abbreviated or eliminated in the interest of brevity. In contrast to the reagent cartridge 300 of FIG. 3, the reagent cartridge 400 of FIG. 4 is carrying the flow cell 122 but does not include the second reservoir 304. Thus, the valve 308 is selectively actuatable to flow reagent through to the flow cell 122 when the reservoir 304 contains reagent and to flow gas through the reservoir 304 and to the flow cell 122 when the reservoir 304 does not substantially contain reagent.

Figure 5:
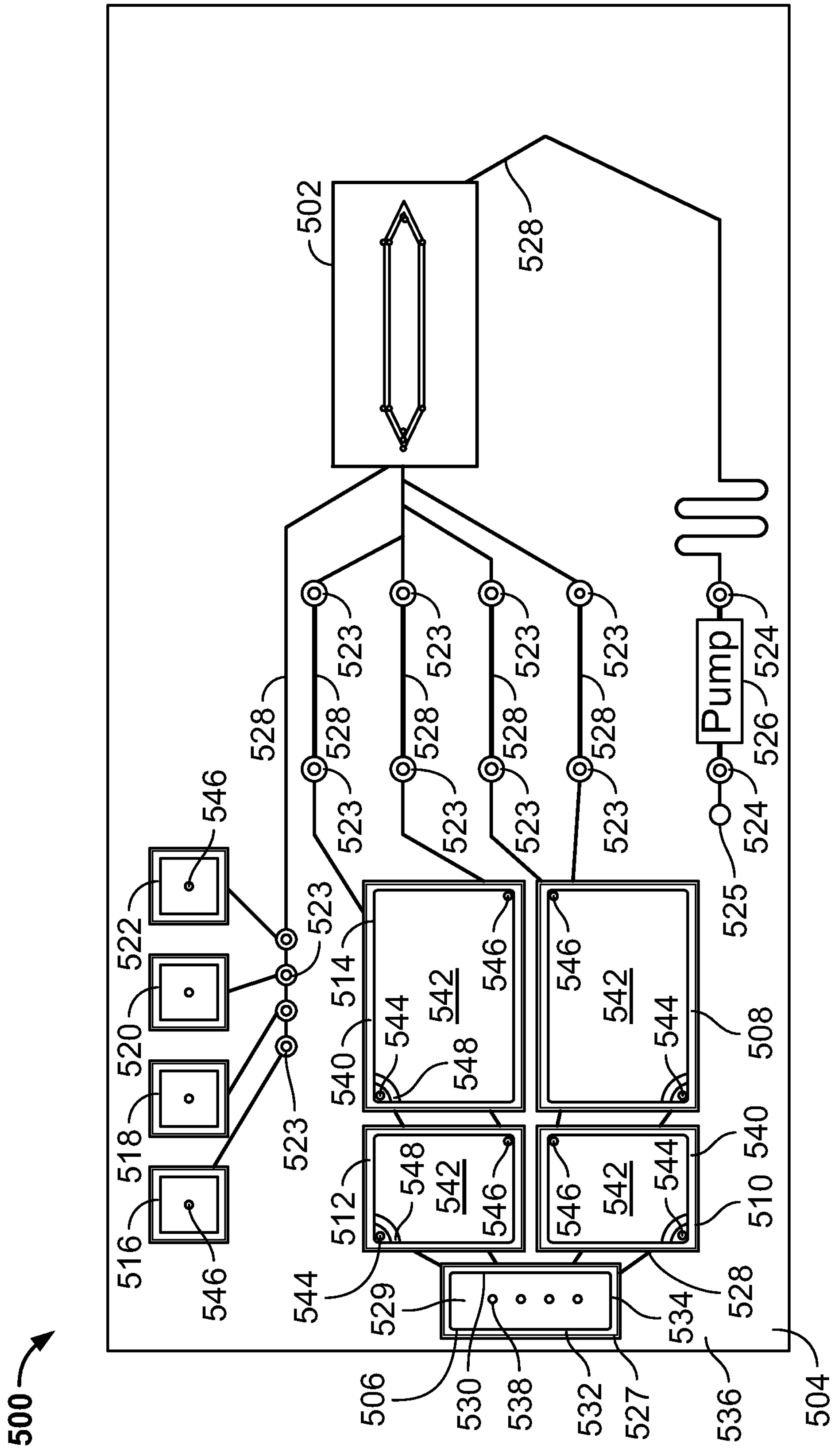
FIG. 5 illustrates a schematic diagram of an example reagent cartridge receivable within a cartridge receptacle of the system of FIG. 1.
Figure 6:
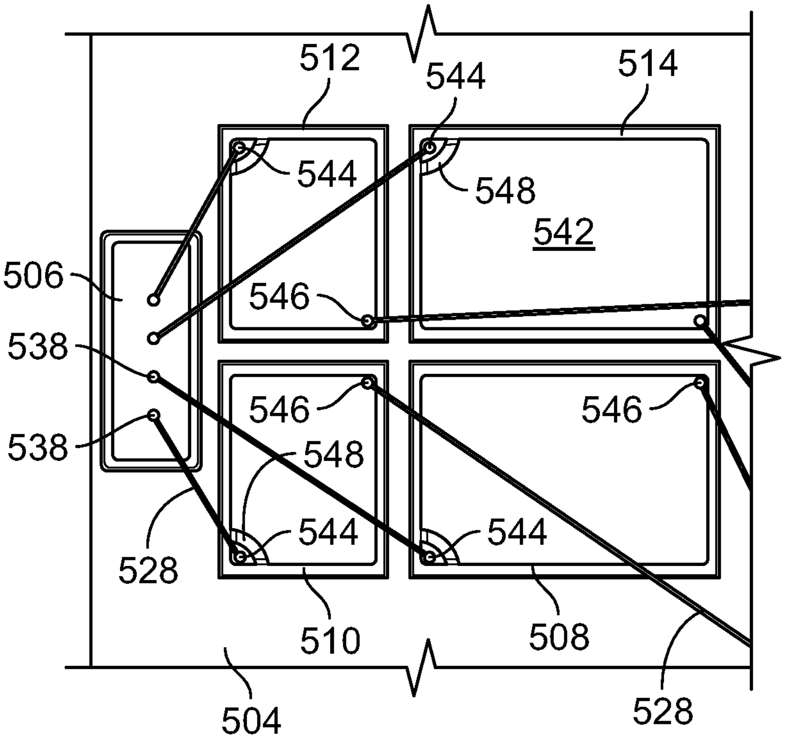
FIG. 6 illustrates a detailed view of the example reagent cartridge of FIG. 5 showing the fluidic couplings between a manifold of the reagent cartridge and reagent reservoirs of the reagent cartridge.
Figure 7:
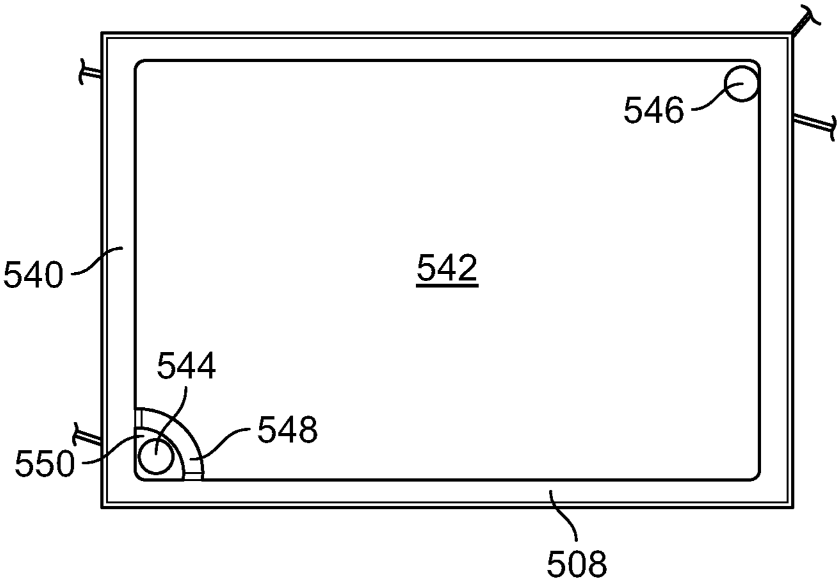
FIG. 7 illustrates a detailed view of one of the reagent reservoirs of the example reagent cartridge of FIG. 5.
Figure 8:
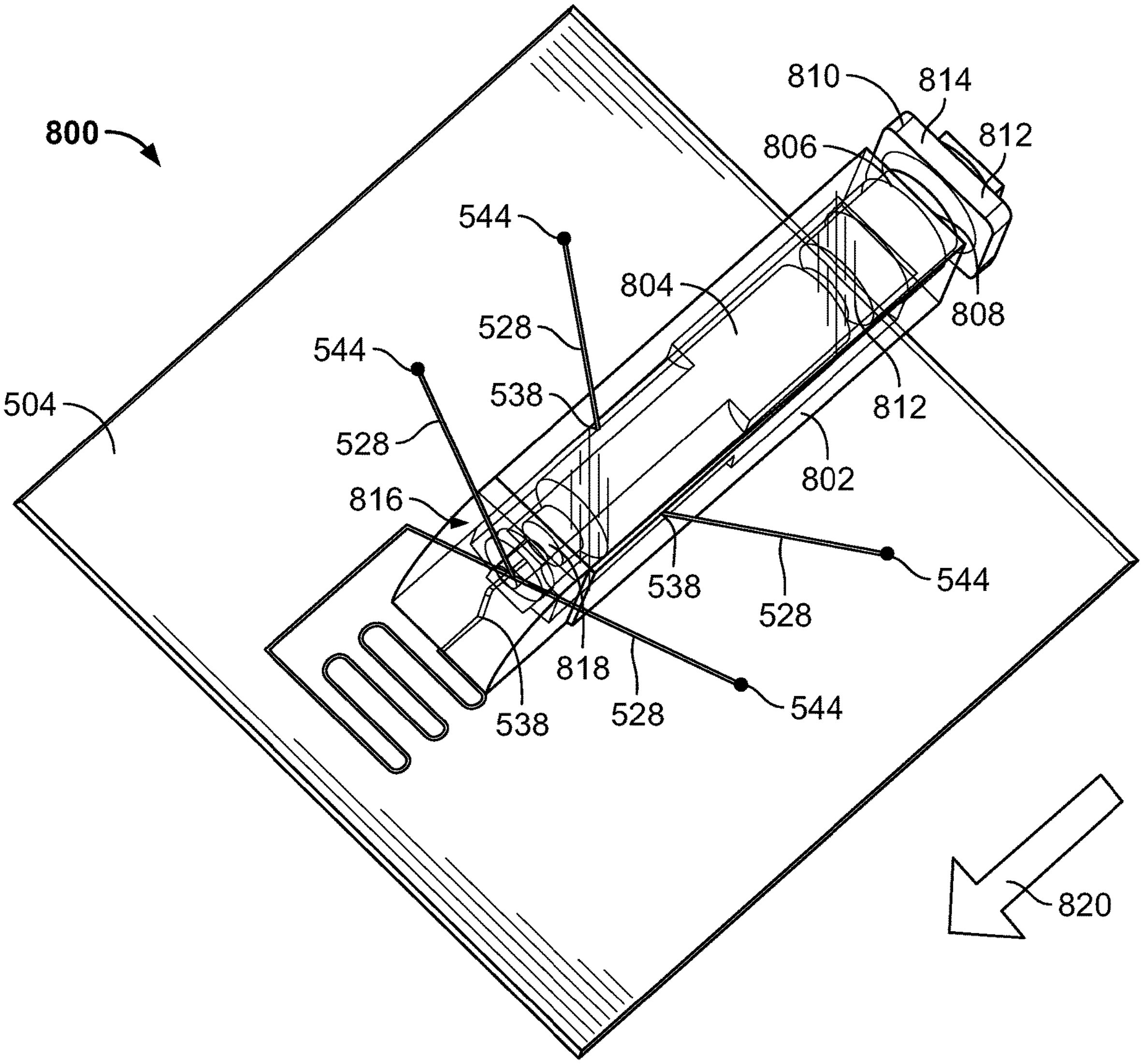
FIG. 8 illustrates a schematic diagram of alternative example manifold that can be used to implement the reagent cartridge of FIG. 5.

While the examples disclosed above illustrate the reagent cartridge 300, 400 including two reservoirs (FIG. 3) or one reservoir (FIG. 4), the reagent cartridges may include any number of reservoirs some or all of which that may be pressurized. One such detailed example of a reagent cartridge 500 is illustrated in FIGS. 5, 6, and 7 and another such detailed example of a manifold 800 for a reagent cartridge is illustrated in FIG. 8. The reagent cartridge 500 and a reagent cartridge carrying the manifold 800 may be receivable within the cartridge receptacle 110 of the system 100 of FIG. 1 and are adapted to interface with the drive assembly 104 of the system 100 to perform the fluidic and/or analysis operations disclosed.

Referring to FIG. 5, the reagent cartridge 500 carries a flow cell 502 and includes a body 504, a manifold 506, reagent reservoirs 508 through 522, valves 523, 524, and a pump 526, which are fluidly coupled by fluidic lines 528. In some examples, the reagent reservoirs 508 through 522 are integrally formed with the body 504. In other examples, the reagent reservoirs 508 through 522 are separately formed but are coupled to the body 504.

In the example shown, the first through fourth reagent reservoirs 508 through 514 are fluidly coupled to the manifold 506 and to the flow cell 502. The manifold 506 is adapted to be fluidly coupled to the gas source 103 of the system 100 to pressurize the first through fourth reagent reservoirs 508-514 and to flow any fluid therein toward the flow cell 502 under positive pressure when corresponding valves 523 are opened. When one or more of the first through fourth reagent reservoirs 508-514 are empty (e.g., do not substantially contain reagent or another reaction component), gas can flow through one or more of the empty reagent reservoirs 508-514 through the flow cell 502 to an outlet 525 associated with the waste reservoir 109.

The fifth through eighth reagent reservoirs 516-522 are fluidly coupled to the flow cell 502 and to the pump 526. Operating the pump 526 draws reagent from respective ones of the fifth through eighth reagent reservoirs 516-522 through the flow cell 502 under negative pressure toward the outlet 525.

Referring back to the manifold 506, in the example shown, the manifold 506 includes walls 527 that extend from a base 529. The base 529 is rectangular and the walls 527 include a first portion 530 and a second portion 532. The first portion 530 of the walls 527 is coupled to the base 529 and the second portion 532 of the walls 527 includes a lip or a peripheral surface (an interface) 534. The base 529 of the manifold 506 defines outlet ports 538 that are fluidly coupled to the first through fourth reagent reservoirs 508-514. Alternatively, one or more of the walls 527 may define the outlet ports 538.

In an example, to pressurize the reagent cartridge 500, the peripheral surface 534 is matingly engaged by an interface of the system 100 to fluidly couple the gas source 103 and the fluidics cartridge 500. The peripheral surface 534 may include a gasket (e.g., a seal) and/or may be rounded and/or may have another contour. For example, the peripheral surface 534 may be concave, convex, tapered, and/or flat relative to a surface 536 of the body 504 of the reagent cartridge 500.

Referring to the first through fourth reagent reservoirs 508-514, the first through fourth reagent reservoirs 508-514 also include walls 540 that extend from respective bases 542. The bases 542 of the reagent reservoirs 508-514 define inlet ports 544 and outlet ports 546. The outlet ports 538 of the manifold 506 are fluidly coupled to the inlet ports 544 of the reagent reservoirs 508-514 via the fluidic lines 528 (FIG. 6 most clearly shows the couplings between the manifold 506 and the reagent reservoirs 508-514).

In the example shown, the reagent reservoirs 508-514 also include barriers 548 positioned adjacent the inlet ports 544 (FIG. 7 most clearly shows the barrier 548 of the first reagent reservoir 508). In the example shown, each barrier 548 is formed as an arch-shaped wall that extends from the base 542 and between two of the walls 540. The inlet port 544 of each of the first through fourth reagent reservoirs 508-514 is positioned between the barrier 548 and the walls 540. In some examples, the barrier 548 acts as a dam that deters backflow of reagent from the reagent reservoirs 508-514 back through the fluidic line 528 toward the manifold 506. Additionally or alternatively, the base 529 may be positioned (angled) to encourage the flow of the reagent toward the outlet port 546 and not toward the inlet port 544.

To flow reagent to the flow cell 502 from one or more of the first through fourth reagent reservoirs 508-514 under positive pressure, the valve drive assembly 131 actuates the associated valves 523 and the reagent flows toward the flow cell 502. When associated ones of the reagent reservoirs 508-514 is substantially empty, actuating the associated valve 523 flows gas through that reagent reservoir 508, 510, 512 and/or 514 toward the flow cell 502. In alternative examples, an additional fluidic line and an associated valve may be provided that directly couples the manifold 506 and the flow cell 502 or couples the manifold 506 upstream of the fluidic lines 528 connecting the reagent reservoirs 508 through 522 to the flow cell 502. In such examples, gas can flow through the flow cell 502 and/or the fluidic lines 528 while one or more of the first through fourth reagent reservoirs 508-514 contain fluid.

While the “air-burst” method and the “air-flush” method both disclose flowing reagent through the flow cell 502 from the first through fourth reagent reservoirs 508-514 under positive pressure in the example shown, reagent can alternatively be drawn from one or more of the first through eighth reagent reservoirs 508-522 through the reagent cartridge 200 under negative pressure using the pump 526. Specifically, reagent may be drawn to the flow cell 502 from the first through fourth reagent reservoirs 508-514 under negative pressure by depressurizing (or not pressurizing) those reagent reservoirs 508-514. After the reagent flows through the flow cell 502, the reagent may be urged toward the outlet 525 associated with the waste reservoir 109 of the system 100. To prevent backwash flow when operating the pump 526, the valves 524 implemented by, for example, check valves, are disposed on either side of the pump 526. In other examples, the valves 524 may not be included.

FIG. 6 illustrates a detailed view of the fluidic lines 528 fluidly coupling the outlet ports 538 of the manifold 506 of FIG. 5 and the inlet ports 544 of the respective reagent reservoirs 508-514 of FIG. 5.

FIG. 7 illustrates a detailed view of the barrier 548 and the walls 540 forming a space 550 in which the inlet port 544 of the first reagent reservoir 508 is positioned.

FIG. 8 illustrates a schematic diagram of an alternative example manifold 800 that can be used to implement the reagent cartridge 500 in accordance with the teachings of this disclosure. Elements of the manifold 800 which are the same or similar to the reagent cartridge 500 are designated by the same reference numeral. A description of these elements is abbreviated or eliminated in the interest of brevity.

In contrast to the manifold 506 of FIGS. 5-7, the manifold 800 of FIG. 8 defines a blind bore (a receptacle) 802 that is adapted to receive a gas source 804. Thus, the manifold 800 of FIG. 8 carries the gas source 804 as opposed to being fluidly coupled to a gas source of the system 100. The gas source 804 is illustrated as a compressed-gas cartridge (e.g., a $CO_2$ cartridge) positioned within the bore 802. The bore 802 includes an opening 806 that allows the gas source 804 to be received by the manifold 800.

In the example shown, a body 808 of a plug 810 is received within a first end 812 of the bore 802. The plug 810 also includes a flange 814. The body 808 of the plug 810 may be coupled to the manifold 800 via threads or an interference fit. In some examples, the coupling between the plug 810 and the manifold 800 provides a seal (e.g., a hermetic seal) that deters gas from escaping from the bore 802. The flange 814 may be adapted to mate with a tool (e.g., a wrench) to facilitate threading the plug 810 into the manifold 800.

A piercing mechanism 816 is disposed within a second end 818 of the bore 802 opposite the first end 812 and the opening 806. The piercing mechanism 816 may be implemented by a spike or another pointed object that is adapted to pierce an end of the gas source 804. To allow gas to flow from the gas source 404, the body 808 of the plug 810 is adapted to urge the gas source 804 within the bore 802 in a direction generally indicated by arrow 820 and drive the gas source 804 into the piercing mechanism 816 to pierce the gas source 804 and allow the gas to flow through the fluidic lines 528 and the respective inlet ports 544 to pressurize the first through fourth reagent reservoirs 508-514. In some implementations, the piercing mechanism 816 may be omitted and the gas source 804 may screw into a fluid connection socket for fluidly coupling the gas source 804 to the fluidic lines 528.

Figure 9:
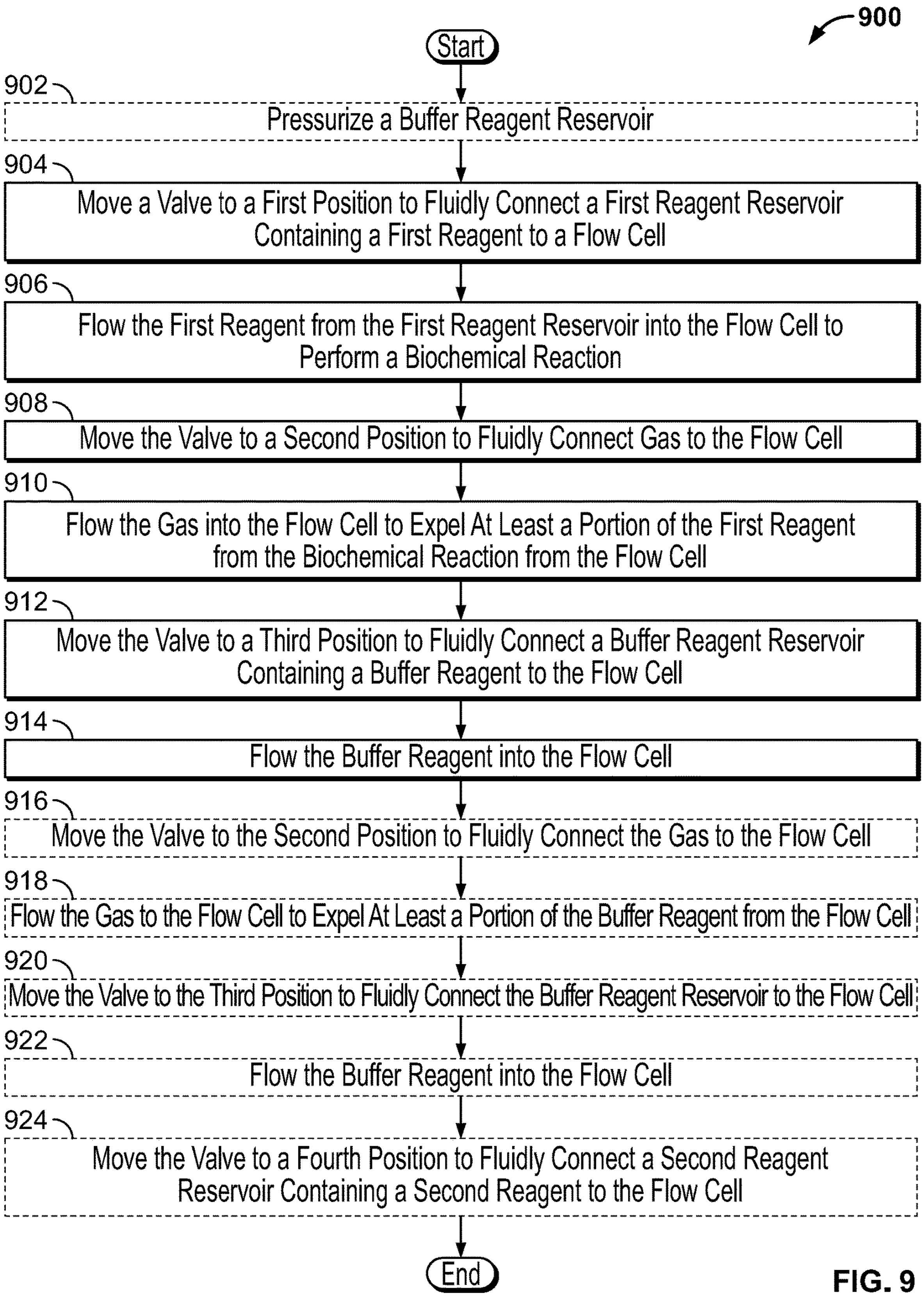
FIG. 9 illustrates a flowchart for a method of performing a flushing operation using the system of FIG. 1.

FIG. 9 illustrates a flowchart for a method of performing a flushing operation using the system 100 of FIG. 1. In the flow chart of FIG. 9, the blocks surrounded by solid lines may be included in an example process 900 while the blocks surrounded in dashed lines may be optional in the example process. However, regardless of the way the border of the blocks is presented in FIG. 9, the order of execution of the blocks may be changed, and/or some of the blocks described may be changed, eliminated, combined, and/or subdivided into multiple blocks.

The process 900 begins at block 902 by pressurizing a buffer reagent reservoir of the reagent cartridge 102. In an example, the one or more processors 134 executing instructions stored in the memory 136 cause the gas source 103 to pressurize the buffer reagent reservoir. The process 900 moves the valve 118 to a first position to fluidly connect a first reagent reservoir containing a first reagent to the flow cell 122. (block 904). In an example, the one or more processors 134 executing instructions stored in the memory 136 cause the valve drive assembly 131 to move the valve 118 to the first position. In some examples, the valve 118 includes a plurality of valves such as those illustrated in connection with FIG. 5. In some such examples, actuating the valve 118 to the first position includes actuating a first one of the valves, actuating the valve to a second position includes actuating a second one of the valves, actuating the valve to a third position includes actuating a third one of the valves, actuating the valve to a fourth position includes actuating a fourth one of the valves, etc. However, one or more valves may be used to control fluid flow through the reagent cartridge 102. The first reagent from the first reagent reservoir is flowed into the flow cell 122 to perform a biochemical reaction. (block 906). For example, a predetermined amount of the first reagent may be flowed into the flow cell 122. The predetermined amount may be associated with opening the valve 118 for a threshold amount of time, flowing a volume of the reagent through the reagent cartridge 102, etc.

The valve 118 is moved to a second position to fluidly connect gas to the flow cell. (block 908). In an example, the one or more processors 134 executing instructions stored in the memory 136 cause the valve drive assembly 131 to move the valve 118 to the second position to fluidly connect the gas source 103 and the flow cell 122. The gas is flowed into the flow cell 122 to expel at least a portion of the first reagent from the biochemical reaction from the flow cell 122. (block 910). In some examples, flowing gas to the flow cell 122 includes flowing gas through a reagent reservoir that is substantially empty. In other examples, flowing gas to the flow cell 122 includes flowing gas through a fluidic line coupled between the gas source 103 and the flow cell 122. Additionally or in the alternative, flowing gas to the flow cell 122 includes flowing gas through the manifold 112 of the reagent cartridge 102. Regardless, in an example, a predetermined amount of gas is flowed into the flow cell 122. The predetermined amount may be associated with opening the valve 118 for a threshold amount of time.

The valve 118 is moved to a third position to fluidly connect a buffer reagent reservoir containing a buffer reagent to the flow cell 122. (block 912). In an example, the one or more processors 134 executing instructions stored in the memory 136 cause the valve drive assembly 131 to move the valve 118 to the third position. The buffer reagent is flowed into the flow cell 122. (block 914). In an example, a predetermined amount of the buffer reagent is flowed to the flow cell 122. The valve 118 is moved to the second position to fluidly connect the gas to the flow cell 122. (block 916). The gas is flowed to the flow cell 122 to expel at least a portion of the buffer reagent from the flow cell 122. (block 918). In an example, a predetermined amount of the gas is flowed to the flow cell 122.

The valve 118 is moved to the third position to fluidly connect the buffer reagent reservoir to the flow cell 122. (block 920). The buffer reagent is flowed into the flow cell 122. (block 922). In an example, a predetermined amount of the buffer reagent is flowed to the flow cell 122. The valve 118 is moved to a fourth position to fluidly connect a second reagent reservoir containing a second reagent to the flow cell 122. (block 924). In an example, the one or more processors 134 executing instructions stored in the memory 136 cause the valve drive assembly 131 to move the valve 118 to the fourth position.

Figure 10:
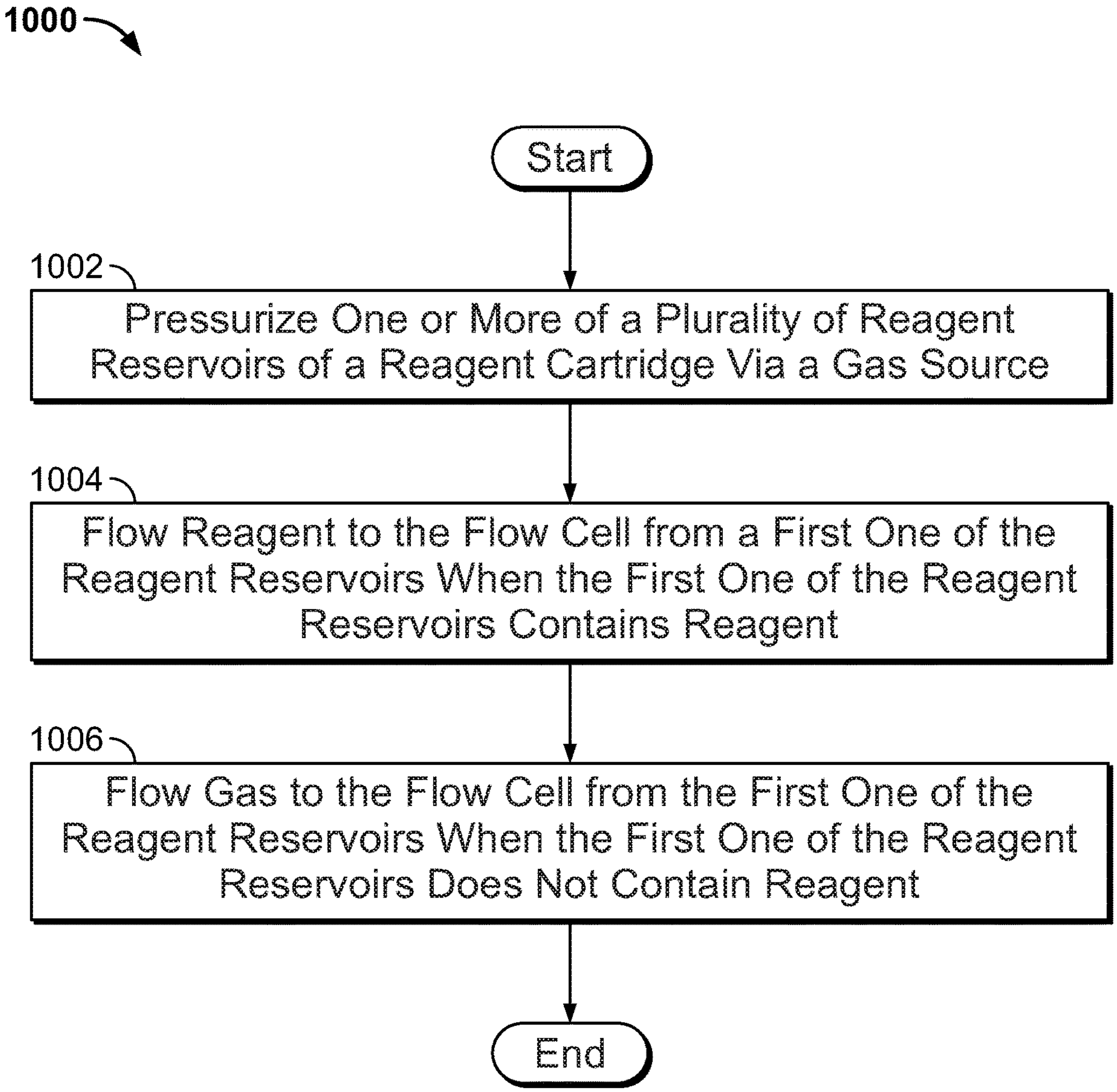
FIG. 10 illustrates a flowchart for another method of performing a flushing operation using the system of FIG. 1.

FIG. 10 illustrates a flowchart for a method of performing a flushing operation using the system 100 of FIG. 1. A process 1000 begins at block 1002 with pressurizing one or more of the reagent reservoirs 114 of the reagent cartridge 102 via the gas source 103. One or more of the reagent reservoirs contain reagent. The reagent cartridge 102 carries the flow cell 122 and includes the fluidic lines 120. One or more of the fluidic lines 120 fluidly couples the reagent reservoirs 114 and the flow cell 122. In an example, the one or more processors 134 executing instructions stored in the memory 136 cause the gas source 103 to pressurize the reagent reservoirs 114. At block 1004, the process includes flowing reagent to the flow cell 122 from a first one of the reagent reservoirs 114 when the first one of the reagent reservoirs 144 contains reagent. At block 1006, the process 1000 includes flowing gas to the flow cell 122 from the first one of the reagent reservoirs 114 when the first one of the reagent reservoirs 114 does not substantially contain reagent.

With reference to the flowcharts illustrated in FIGS. 9 and 10, the order of execution of the blocks may be changed, and/or some of the blocks described may be changed, eliminated, combined and/or subdivided into multiple blocks.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word “a” or “an” should be understood as not excluding plural of said elements or steps, unless such exclusion is explicitly stated. Furthermore, references to “one implementation” are not intended to be interpreted as excluding the existence of additional implementations that also incorporate the recited features. Moreover, unless explicitly stated to the contrary, implementations “comprising,” “including,” or “having” an element or a plurality of elements having a particular property may include additional elements whether or not they have that property. Moreover, the terms “comprising,” including,” having,” or the like are interchangeably used herein.

The terms “substantially,” “approximately,” and “about” used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. An apparatus, comprising:
- a fluidics cartridge receivable within a cartridge receptacle of a system and adapted to carry a flow cell, the fluidics cartridge comprising:
  - a first reagent reservoir containing a first reagent and a buffer reagent reservoir containing a buffer reagent;
  - a valve; and
  - a body comprising fluidic lines and an inlet port, the inlet port adapted to be coupled to a gas source, the body carrying the first reagent reservoir, the buffer reagent reservoir, and the valve, the fluidic lines fluidly coupling the inlet port, the first reagent reservoir, the buffer reagent reservoir, the valve, and the flow cell, the inlet port upstream of the first reagent reservoir and the buffer reagent reservoir, the valve downstream of the first reagent reservoir and the buffer reagent reservoir, wherein the first reagent reservoir is to be pressurized by the gas source to enable the first reagent to be flowed under positive pressure;
  - wherein the valve is movable:
    - to a first position to fluidly connect the first reagent reservoir to the flow cell to flow the first reagent from the first reagent reservoir into the flow cell under positive pressure to perform a biochemical reaction;
    - to a second position to fluidly connect the gas source to the flow cell to flow gas into the flow cell to expel at least a portion of the first reagent from the biochemical reaction from the flow cell; and
    - to a third position to fluidly connect the buffer reagent reservoir to the flow cell to flow the buffer reagent into the flow cell.

2. The apparatus of claim 1, further comprising a second reagent reservoir containing a second reagent, wherein the fluidic lines fluidly couple the inlet port, the second reagent reservoir, the valve, and the flow cell, and wherein the valve is further movable:
- to the second position to fluidly connect the gas source to the flow cell to flow gas into the flow cell to expel at least a portion of the buffer reagent from the flow cell;
- to the third position to fluidly connect the buffer reagent reservoir to the flow cell to flow the buffer reagent into the flow cell; and
- to a fourth position to fluidly connect the second reagent reservoir to the flow cell.

3. The apparatus of claim 1, wherein the buffer reagent reservoir is pressurized via the gas source.

4. The apparatus of claim 1, further comprising a second reagent reservoir, wherein in the second position and when the second reagent reservoir does not substantially contain fluid, the gas source is fluidly connected to the flow cell through the second reagent reservoir.

5. The apparatus of claim 1, wherein one of the fluidic lines directly fluidly couples the inlet port and the flow cell.

6. The apparatus of claim 1, wherein the fluidics cartridge comprises a manifold, the manifold including the inlet port, the fluidic lines coupling the manifold, the valve, and the buffer reagent reservoir.

7. The apparatus of claim 6, wherein the inlet port comprises an interface adapted to be sealingly engaged by the system when the fluidics cartridge is received within the cartridge receptacle to fluidly couple the inlet port and the gas source of the system.

8. The apparatus of claim 6, wherein the inlet port comprises walls that extend from a base, the walls having a first portion and a second portion, the first portion coupled to the base, the second portion forming an interface that is adapted to couple with the gas source, the base defining outlets fluidly coupled to the reservoirs.

9. The apparatus of claim 1, wherein the gas source comprises a compressed-gas cartridge.

10. The apparatus of claim 1, wherein the gas source comprises a compressed-gas cartridge, and further comprising a plug and a piercing mechanism, a receptacle of a manifold comprising a first portion and a second portion, the piercing mechanism disposed within the first portion and is adapted to pierce the compressed-gas cartridge to allow gas to flow into the manifold, the plug being coupled to the manifold adjacent the second portion.

11. The apparatus of claim 1, wherein the body comprises the reservoirs.

* * * * *